United States Patent

[11] 3,567,079

| [72] | Inventor | Cleone H. Weigand<br>Fountain City, Wis. 54629 |
|---|---|---|
| [21] | Appl. No. | 751,314 |
| [22] | Filed | Aug. 8, 1968 |
| [45] | Patented | Mar. 2, 1971 |
| | | Continuation-in-part of application Ser. No. 588,160, Oct. 20, 1966, now abandoned. |

[54] DISPENSER CONTAINER WITH METERING NECK
11 Claims, 7 Drawing Figs.

[52] U.S. Cl. .................................................. 222/213,
222/500
[51] Int. Cl. .................................................. B65d 37/00
[50] Field of Search .................................................. 222/213,
438—440, 442, 444, 448—452, 207, 477;
239/327, 321, 322; 222/387, 492; 222/389, 491,
493, 496, 453

[56] References Cited
UNITED STATES PATENTS

| 1,654,905 | 1/1928 | Voos | 222/387 |
|---|---|---|---|
| 2,552,195 | 5/1951 | Lopata | 222/492X |
| 2,904,227 | 9/1959 | Graham | 222/213X |
| 2,425,313 | 8/1947 | Hammerstein | 222/500X |
| 3,146,919 | 9/1964 | Chappell | 222/500X |
| 3,244,324 | 4/1966 | Croslin | 222/181X |

Primary Examiner—Robert B. Reeves
Assistant Examiner—Norman L. Stack, Jr.
Attorney—Wheeler, House & Wheeler ABSTRACT: A compressible or yieldable fluid container with an elongated neck in the form of a metering chamber receives a piston or ball which is urged through the metering chamber by compression of the container wall. The length of the metering chamber and thus the quantity of fluid to be discharged may be varied by axial adjustment of a tubular valve stem located within the metering chamber. The outer end of the hollow valve stem projects from the metering chamber and serves as the container outlet. The inner end of the valve stem has a valve seat to receive the free piston and limit travel of the piston. In one embodiment fluid flow through the metering chamber is controlled by minor and major pistons connected in tandem by a piston rod. In some embodiments a vacuum chamber at the inner end of the metering chamber retards initial piston movement and premature leakage until the metering chamber is filled with the measured charge and the charge is dispensed.

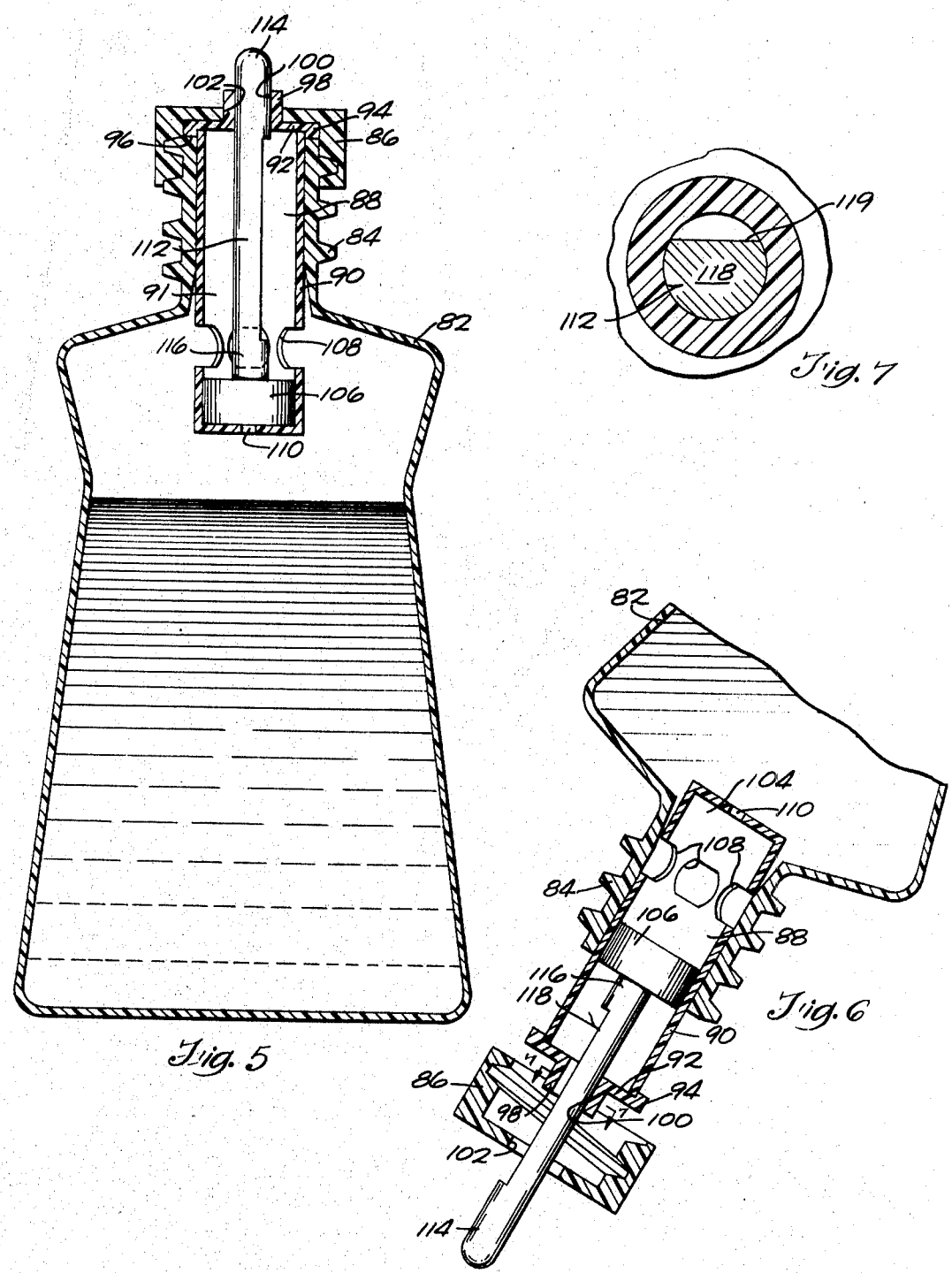

3,567,079

DISPENSER CONTAINER WITH METERING NECK

CROSS-REFERENCE TO RELATED APPLICATION

The present application is a continuation-in-part of my copending U.S. Pat. application Ser. No. 588,160 filed Oct. 20, 1966, now abandoned.

BACKGROUND OF INVENTION

This invention relates to fluid dispenser containers with collapsible walls which discharge a selected measured quantity of fluid therefrom.

Various difficulties have been encountered in the art in providing a dispenser which performs effectively with both thick or viscous fluids and thin fluids and which can vary the volume of the fluid discharged.

In collapsible containers which utilize a free piston to sweep a metered charge from a metering chamber, problems have occurred in attempting to prevent premature leakage from the outlet when the container is inverted to fill the metering chamber. Furthermore, prior art devices fail to prevent leakage around the free piston when the metered charge is dispensed and also fail to seal the metering chamber from the outside air when the container is not in use causing evaporation and accumulation of deposits on the metering chamber walls.

SUMMARY OF INVENTION

According to the present invention, a compressible or yieldable fluid container is provided with a metering chamber having an adjustable valve stem which is movable within the metering chamber to vary the length of the metering chamber and thus the quantity of fluid dispensed. The tubular aperture in the valve stem serves as the container outlet. The inner end of the stem is provided with an enlarged end which engages the walls of the metering chamber or container neck to form a fluid seal and also serve as a seat to receive the free piston and prevent fluid flow through the stem once the metered charge is dispensed.

To insure filling of the metering chamber before dispensing action occurs, some embodiments are provided with a vacuum chamber with a piston release vent to retard initial piston movement through the metering chamber upon inversion of the container and prior to discharge of the contents of the metering chamber.

In one embodiment, premature leakage is minimized by a piston rod which is movable through the hollow valve stem. The piston rod is provided with a helical flute to increase the length of fluid travel and delay dripping from the metering chamber.

A further embodiment utilizes three pistons connected in tandem to control premature leakage from the metering chamber and seal the metering chamber from outside air when the container is not in use.

Further objects and advantages of the invention will become apparent from the following disclosure in which:

FIG. 5 is a vertical cross section of another embodiment of a fluid dispenser embodiment various features of the invention and shown in an upright position;

FIG. 6 is a fragmentary sectional view of the embodiment shown in FIG. 5 in a partially inverted position; and FIG. 7 is a cross section along line 7–7 of FIG. 6.

DETAILED DESCRIPTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
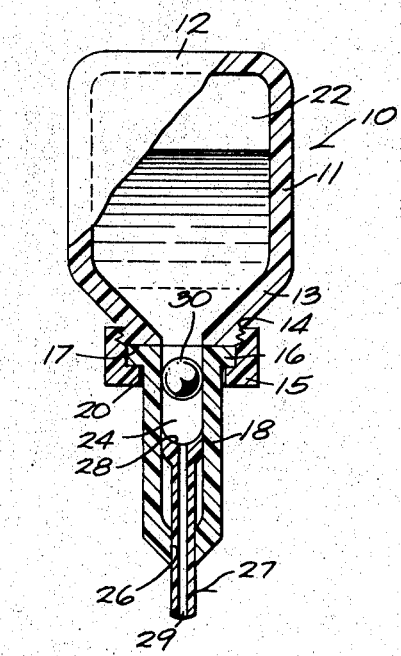
FIG. 1 is a vertical cross section taken through an inverted fluid dispenser embodying the invention.

Referring now to the drawings, FIG. 1 shows a container 10 which is desirably made of plastic and which has a compressible or yieldable sidewall 11 integral with a bottom wall 12. In the embodiment disclosed in FIG. 1, the wall 11 converges to provide a shoulder 13. The shoulder 13 terminates at an exterior threaded portion 14 which receives a threaded collar clamp 15 which secures an annular outwardly extending flange 16 of neck 18 in clamping engagement with the surface 17 of container shoulder 13. When the neck 18 is secured in place it extends through an aperture 20 in collar 15 with a fit that affords a fluid seal. The bottom wall 12, sidewall 11 and shoulder 13 define a container interior 22.

An elongated cylindrical bore in the neck 18 provides a metering chamber 24 of uniform cross section.

In accordance with the invention, means are provided for selectively varying the travel of a free piston 30 in the chamber 24 to vary the volume of fluid dispensed by the container 10. As disclosed, the means are in the form of a selectively adjustably positionable valve stem 27. The stem 27 comprises a hollow tube with a valve seat 28 at the inner end. In the embodiment disclosed in FIG. 1 the valve seat 28 is in the form of a concave outwardly open cup or semispherical surface which is complementary to the free piston or ball 30 and cooperates to provide a fluid seal when the piston 30 is seated therein. The valve stem 27 has a fit in the neck aperture 26 that permits manual movement of the stem 27 but also provides a fluid seal therebetween. A tubular passage 29 in the stem 27 serves as the container outlet. Varying the length of the metering chamber by moving the valve stem 27 axially will accordingly vary the effective volume of the cylinder in which the free piston or ball 30 moves and thus vary the quantity of fluid discharged from the metering chamber upon collapsing the container walls.

The metering ball or piston 30 is constructed of metal or other relatively dense material to avoid any buoyant effect caused by the container fluid that may tend to oppose or delay movement of the ball through the fluid to the metering chamber 24 upon inversion of the container 10. The ball 30 is of a diameter slightly less than the metering chamber 24 to permit movement of the ball through the neck upon inversion. The ball 30 fits snugly in the chamber to sweep the metered charge ahead of the ball as it is forced toward the seat 28.

Figure 2:
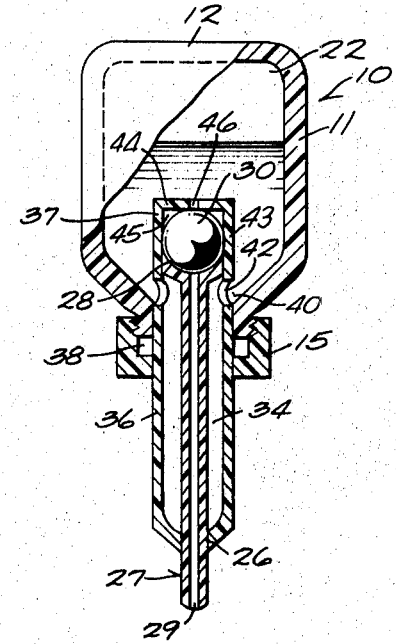
FIG. 2 is a similar vertical cross section taken through a modified embodiment of the fluid dispenser.

FIG. 2 shows a further embodiment of the invention in which a metering chamber 34 is formed within a neck or sleeve 36 which is provided with an out-turned flange 38 which is clamped to the container 12 by collar 15. The neck 36 has a neck portion 40 located within the container interior 22. The portion 40 is provided with a series of circumferentially spaced apertures 42 adjacent the shoulder 13 to afford filling of the metering chamber 34 upon inversion of the container 10.

The valve stem 27 and valve seat 28 in FIG. 2 are the same as in FIG. 1. The piston 30 is shown seated against the valve seat 28 to seal the container as hereinafter described.

To retard movement of the free piston or metering ball 30 to enable filling of the metering chamber 34 prior to squeezing the container walls, the neck 36 is provided with an end cap or inner end wall 44 which spans the inner end 37 of the neck 36. The end wall 44 and the portion 43 of the neck 36 between the apertures 42 and the inner end 37 form a vacuum chamber 45 which delays movement of the piston 30 through the metering chamber. A release vent 46 is provided to permit release of the ball from the vacuum chamber upon squeezing the container walls. The pressure created by deflection of the container walls is sufficient to overcome the retarding effect of the vacuum chamber 45. The diameter of the vent 46 is selected for the viscosity of the fluid to be used in the container. With a less viscous fluid the preferred diameter is smaller than the diameter used with a viscous fluid to obtain the same retarding effect. The buoyancy caused by the more viscous fluid will tend to retard downward movement of the piston 30.

In the embodiment shown in FIG. 2 the adjustable valve stem 27 also cooperates with the metering ball 30 and the vacuum chamber 45 to serve as the bottle closure. When the container is not in use, as shown in this FIG., the valve stem 27 is pushed into engagement with the metering ball or piston 30 in the vacuum chamber with the piston 30 pressed against the end wall 44 to seal the container interior 22.

Figure 3:
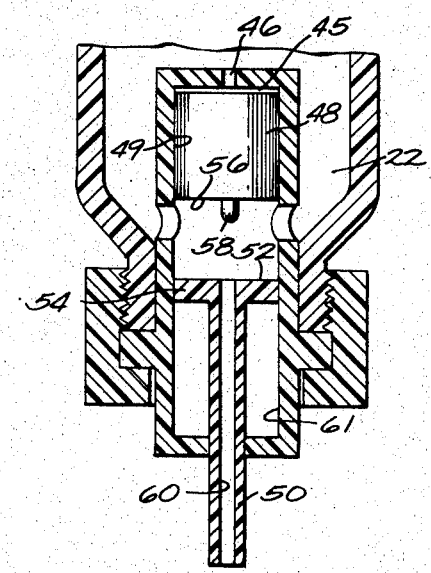
FIG. 3 is a fragmentary vertical cross section taken through an inverted still further modified embodiment of the fluid dispenser of the invention.

FIG. 3 shows a further embodiment of the invention in which the free piston 48 is in the form of a cylinder which is preferable for use with light or less viscous fluids because the piston 48 has a larger cylindrical surface area in engagement with the wall of the metering chamber to prevent fluid flow-by or leakage around the piston 48. A seal between the free piston 48 and the valve stem 50, to prevent fluid flow from the container interior 22 subsequent to dispensing of the metered charge, is provided by a flat valve seat 52 which comprises the upper surface of an out-turned flange 54 on the valve stem 50 and which cooperates with the flat surface 56 of the piston 48. Further sealing is provided by a valve member 58 which is in the form of a coaxial projection of the piston 48 and which projects within the tubular opening 60 in the valve stem 50. The use of cylindrical piston 48 also increases the vacuum within the vacuum chamber 59 by providing a more effective seal between the piston walls and the vacuum chamber walls.

The embodiment shown in FIG. 3 can be constructed with generous tolerances between the piston 48 and metering chamber walls because of the effective sealing arrangements.

Figure 4:
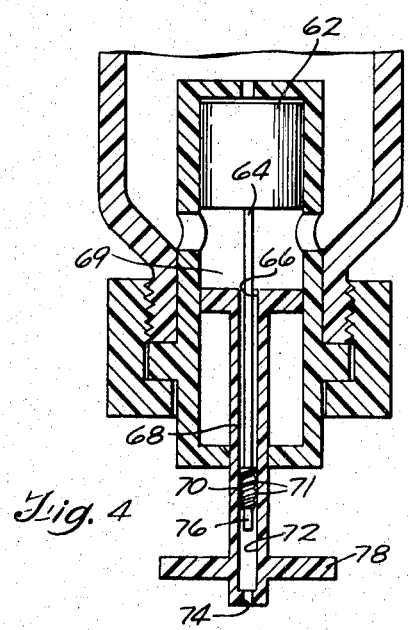
FIG. 4 is a fragmentary vertical cross section of a still further embodiment of the fluid dispenser of the invention.

The embodiment shown in FIG. 4 is particularly adapted for use with thin or light fluids. The piston 62 is provided with a piston rod 64 which is reciprocal within tubular opening 66 in valve stem 68. To minimize leakage when the receptacle is inverted to fill the metering chamber 69, the prior to collapsing the container walls to sweep the piston 62 through the metering chamber 69, the piston rod is provided with a helical or circumferentially and axially extending flute 70 defined by a raised portion or land 71 which engages the inner wall 72 of the valve stem 68 to prevent direct fluid flow. Fluid flow is afforded along the helical path provided by the flute. The use of the helical flute 70 increases the effective length of the travel of fluid from within the metering chamber through the valve stem 68. Thus, the metering chamber will fill upon inversion of the container prior to any leakage through the valve stem so that only the metered charge will be dispensed.

In the embodiment shown in FIG. 4, an outer seal is provided to prevent passage of air into the valve stem when the dispenser is not in use. The seal comprises a restricted orifice 74 at the outer end of the valve stem 68 and the tip 76 of the piston rod which cooperates with the orifice 74 to provide a fluid seal.

Axial adjustment of the valve stem 68 is facilitated by a handle formed by an out-turned flange 78 adjacent the outer end of the valve stem.

The embodiment shown in FIGS. 5, 6, 7 utilizes three pistons connected in tandem, as hereinafter described in detail, to control fluid flow through the metering chamber and seal the container when it is not in use.

The container 82 shown in FIGS. 5, 6 and 7 is provided with an elongated threaded neck 84 which receives a threaded collar 86. The metering chamber 88 is defined by a cylindrical tube 90 which has a portion 91 located within the neck 84. Tube 90 is provided with an outer end wall 92 which has a downwardly extending annular flange 94 which seats against a shoulder 96 at the upper end of the neck 84. The end wall 92 also is provided with an axially extending boss 98 with an aperture 100 which forms the receptacle outlet. Boss 98 projects through an aperture 102 in collar 86.

As in the foregoing embodiments of the invention, the metering chamber is provided with a vacuum chamber 104 (FIG. 6) to retard movement of the major piston 106 to enable filling of the metering chamber through a series of circumferentially arranged apertures 108. The vacuum chamber 104 is provided with a vacuum release vent 110.

To prevent premature discharge of fluid from the metering chamber 88, the dispenser includes a piston rod 112 connected to piston 106 and a first minor piston 114 at the forward or outer end of rod 112. As shown in FIG. 5, the minor piston 114 is located in outlet 100 when the piston 106 is located within the vacuum chamber 104, thus preventing fluid flow upon inversion of the container and while the major piston is retained in the vacuum chamber 104.

The piston rod 112 also includes a second minor piston 116 of the same diameter as the first minor piston 114 to provide a tandem array of three pistons. The piston 116 is adapted to travel into the fluid outlet 100 and seal the fluid outlet at the end of the stroke of the major piston 106 during the dispensing operation. The piston rod 112 has a portion 118 between pistons 114 and 116 which has a lesser diameter than the pistons 114 and 116. As shown in FIG. 7, the portion 118 can be formed by grinding a flat surface 119 on the piston rod. When portion 118 is located in aperture 100 (FIG. 7) fluid can escape from the metering chamber 88.

In operation of the fluid dispenser 82 disclosed in FIGS. 5, 6 and 7, the inversion of the container will cause fluid to flow through inlet ports 108 to fill the metering chamber 88. The piston 106 is located in the vacuum chamber 104 upon inversion and the minor piston 114 is located in the aperture 100 to prevent leakage or premature discharge of fluid from chamber 88. When sufficient time has elapsed to fill the chamber 88, the container 82 is compressed thereby urging the piston 106 through the chamber 88. The contents of chamber 88 are discharged while the portion 118 of the piston rod 112 is located in aperture 100. Continued movement of the piston 106 causes minor piston 116 to travel into aperture 100 and seal the chamber 88. The use of the tandem array of pistons with pistons 114, 116 cooperating with the outlet 100 to prevent unwarranted discharge of fluid permits the use of generous tolerances between the piston 106 and the wall of the metering chamber 88 which insures free movement of the piston 106 and low manufacturing costs.

Various of the features of the invention are set forth in the following claims.

I claim:

1. A dispenser container for fluids comprising a yieldable wall with a neck defining an elongated chamber of substantially uniform cross section communicating with the interior of the container and adapted to contain a metered charge of fluid, said chamber having a dispensing outlet, a free piston within said container adapted to fit within said chamber and be movable along said chamber in response to internal fluid pressure created by deflection of said wall to discharge said metered charge through said outlet and including a hollow stem selectively adjustably slidable axially within said chamber to vary the volume of said chamber and the metered charge, one end of said stem within the chamber having a seat for said piston and the other end of said stem extending outwardly from said chamber and having a dispensing outlet.

2. A dispenser container in accordance with claim 1 wherein said seat of said valve stem has a semispherical surface and said piston has a spherical complementary surface to cooperate with said valve seat and provide a fluid seal when said piston and said surface are in engagement.

3. The dispenser of claim 1 wherein said neck has an extension which projects into the interior of said container, an end wall on the inner end of said extension to form a chamber for said piston and a vent in said end wall, said vent being dimensioned to retard piston movement through said chamber and a aperture in said extension of said neck and spaced from said vent for filling said metering chamber and out-turned flange on said neck intermediate its length and means for securing said flange to said wall.

4. A dispenser container for fluids comprising a yieldable wall with a neck defining an elongated chamber of substantially uniform cross section communicating with the interior of the container and adapted to contain a metered charge of fluid, said chamber having a dispensing outlet, a free piston within said container adapted to fit within said chamber and be movable along said chamber in response to internal fluid pressure created by deflection of said wall to discharge said metered charge through said outlet and including a hollow stem selectively adjustably positionable axially within said chamber to vary the volume of said chamber and the metered charge, one end of said stem within the chamber having a seat for said piston and the other end of said stem extending outwardly from said chamber and having a dispensing outlet, said valve seat being formed by an outwardly extending flange on said valve stem said flange having a margin engageable with the inner surface of the metering chamber to provide a seal and wherein said piston has a cylindrical surface and a flat face which cooperates with said seat to provide a fluid seal.

5. A dispenser container in accordance with claim 4 wherein said piston has an axially extending valve member adapted to interfit in said tubular opening in said valve stem to provide a fluid seal therein.

6. A dispenser container in accordance with claim 4 wherein said piston has a concentrically and axially extending piston rod connected thereto and wherein said piston rod extends into said tubular opening in said valve stem and is of a lesser diameter than said tubular opening to provide fluid flow between said piston rod and said valve stem walls and wherein said piston rod has a circumferentially and axially extending flute intermediate its length which is defined by raised portions which engage the wall of said valve stem to provide a fluid seal between the raised portions and the valve stem walls and a fluid passage through said flute around said piston rod.

7. A dispenser container in accordance with claim 6 wherein said valve stem has an outlet at the outer end which receives the end of said piston rod to create a fluid seal when the end of said rod is located in said outlet.

8. A dispenser container in accordance with claim 6 wherein said elongated chamber extends into said container interior, an end wall across said chamber, an inlet aperture of in said end wall said aperture being dimensioned to restrict fluid flow into said metering chamber between said end wall and said piston for retarding piston movement in said chamber to insure filling of said chamber prior to compression of said yieldable wall.

9. A dispenser container for fluids comprising a yieldable wall defining a container interior, a neck connected to said walls, said neck having a projection extending into said container interior, an inner end wall extending across said projection, a vent in said inner end wall and at least one aperture in said projection of said neck within said container interior and a major piston located in said neck and movable within said neck in response to internal fluid pressure created by deflection of said yieldable wall, said vent being dimensioned to retard movement of said piston to insure filling said neck upon inversion of said container and prior to compression of said yieldable wall, a piston rod connected to said piston, an outer end wall on said neck with an aperture which forms the container outlet which receives said piston rod, said piston rod having a diameter less than said aperture to afford fluid flow through said aperture when said rod is located in said aperture, a first minor piston on the outer end of said piston rod, said piston having a larger diameter than said piston rod, said minor piston fitting in said aperture in said outer end wall to afford a fluid seal when said minor piston is located therein.

10. The dispenser container of claim 9, including a second minor piston, said second minor piston being located adjacent said major piston, said second minor piston being movable into said outlet to seal said outlet when said major piston has swept the fluid from said neck.

11. A dispenser container for fluids comprising a yieldable wall defining a container, an elongated wall defining a chamber extending through said yieldable wall and communicating with the interior of said container, said chamber having first and second end walls, said first end wall being located in said container interior and having an aperture of a preselected diameter to retard fluid flow, said second end wall having a fluid outlet, a fluid entry port in said chamber, said entry port being located within the container interior and spaced from said first end wall a distance greater than the length of said piston to afford fluid flow into said entry port when said piston is adjacent said first end wall, a major piston and a minor piston, said pistons interconnected in tandem by a stem, said major piston being operatively disposed within said chamber to evacuate said chamber upon compression of said yieldable wall, said minor piston cooperating with said fluid outlet in said second wall to seal said outlet initially when said container is inverted from an upright position and then open said fluid outlet as said major piston is urged downwardly through said chamber.